United States Patent [19]
Klazinga et al.

[11] Patent Number: 5,954,946
[45] Date of Patent: *Sep. 21, 1999

[54] HYDROCARBON CONVERSION CATALYSTS

[75] Inventors: Aan Hendrik Klazinga; Theodorus Ludovicus Michael Maesen; Johannes Anthonius Robert Van Veen; Ingrid Maria Van Vegchel, all of Amsterdam, Netherlands

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/959,917

[22] Filed: Oct. 29, 1997

Related U.S. Application Data

[63] Continuation of application No. 08/518,877, Aug. 24, 1995, abandoned.

[30] Foreign Application Priority Data

Aug. 24, 1994 [EP] European Pat. Off. .............. 94202422

[51] Int. Cl.[6] ............................ C10G 47/16; C10G 11/05
[52] U.S. Cl. ......................... 208/111; 208/120; 208/123; 208/124; 502/66; 502/79
[58] Field of Search ....................... 502/79, 66; 208/111, 208/120, 124, 123

[56] References Cited

U.S. PATENT DOCUMENTS

| | | | |
|---|---|---|---|
| 3,130,007 | 4/1964 | Breck | 23/113 |
| 3,536,605 | 10/1970 | Kittrell | 208/59 |
| 4,916,096 | 4/1990 | Hoek et al. | 502/66 |

FOREIGN PATENT DOCUMENTS

| | | |
|---|---|---|
| 2014970 | 2/1979 | United Kingdom . |
| 2114594 | 2/1983 | United Kingdom . |

OTHER PUBLICATIONS

"Advances in Catalysis," vol. 33, Edited by D.D. Eley, Herman Pines, Paul B. Weisz, Academic Press, Inc., 1985, pp. 254–264.

*Primary Examiner*—Bekir L. Yildirim

[57] ABSTRACT

The present invention provides a catalyst comprising a very ultrastable zeolite Y (VUSY) in which less than 15% of the total amount of aluminum (Al) present is octahedrally coordinated; a process for preparing the zeolite; and a hydrocarbon conversion process using the catalyst.

10 Claims, No Drawings

HYDROCARBON CONVERSION CATALYSTS

This is a continuation of application Ser. No. 08/518,877, filed Aug. 24, 1995, now abandoned.

FIELD OF THE INVENTION

The present invention relates to a catalyst comprising a modified zeolite, a process for the preparation of the modified zeolite, and a hydrocarbon conversion process using the catalyst.

BACKGROUND OF THE INVENTION

Of the many hydrocarbon conversion processes known in the art, hydrocracking is becoming increasingly important since it offers product flexibility together with product quality. As it is also possible to subject rather heavy feedstocks to hydrocracking it will be clear that much attention has been devoted to the development of hydrocracking catalysts.

Whereas in the past catalytic hydrocracking was aimed primarily at the production of lower boiling point products such as gasoline, nowadays hydrocracking is often aimed at meeting the increasing demand for high quality middle distillate products.

Therefore, the object nowadays in hydrocracking is to provide a hydrocracking catalyst having a high selectivity towards middle distillates combined with a low selectivity towards gas make, in addition to high activity and stability.

To this end modern hydrocracking catalysts are generally based on zeolitic materials which may have been adapted by techniques like ammonium-ion exchange and various forms of calcination in order to improve the performance of the hydrocracking catalysts based on such zeolitic materials.

One of the zeolites which is considered to be a good starting material for the manufacture of hydrocracking catalysts is the well-known synthetic zeolite Y as described in U.S. Pat. No. 3,130,007. A number of modifications has been reported for this material which include, inter alia, ultrastable zeolite Y (U.S. Pat. No. 3,536,605) and ultrahydrophobic zeolite Y (GB-A-2,014,970) which are hereby incorporated by reference.

It is known that the stability and activity of an ultrastable zeolite Y (USY) can be improved further by subjecting it to a high-temperature steaming step followed by a dillumination step. In this respect reference is made, for instance, to GB-A-2,114,594. It is thought that such a high-temperature steam treatment causes some tetrahedrally coordinated aluminum (Al) species to be removed from the crystal framework. The holes formed in the crystal framework as a result of the removal of these tetrahedrally coordinated aluminum (Al) species are believed to be filled by silicon (Si) species. The aluminum (Al) species which are removed from the crystal framework are present in the pores and channels of the crystal framework and are mainly octahedrally coordinated. These octahedrally coordinated aluminum (Al) species can be removed in the subsequent dealumination step. To this end the steamed material is usually leached with an organic chelating agent, an organic acid or an inorganic acid.

Since the presence of octahedrally coordinated aluminum (Al) species in the pores and channels of the crystal framework is believed to reduce accessibility to the active sites of the crystal framework, it is very desirable if zeolite Y materials can be prepared containing little or no octahedrally coordinated aluminum (Al). Whilst the above dealumination treatment is effective in removing octahedrally coordinated aluminum (Al) species from ultrastable zeolite Y (USY) materials, the results obtained are unsatisfactory when it is applied to very ultrastable zeolite Y (VUSY) materials.

SUMMARY OF THE INVENTION

According to the invention, a catalyst is provided comprising a zeolite Y having a unit cell size below 24.45 Å in which less than 15% of the total amount of aluminum (Al) present is octahedrally coordinated. Further, a process for converting a hydrocarbonaceous feedstock into lower boiling materials using the catalyst is provided.

DETAILED DESCRIPTION OF THE INVENTION

It has now surprisingly been found possible to prepare very ultrastable zeolite Y (VUSY) materials containing little, or substantially no, octahedrally coordinated aluminum (Al).

Therefore, in accordance with the present invention, there is provided a catalyst for use in a hydrocarbon conversion process comprising a very ultrastable zeolite Y (VUSY) in which less than 15% of the total amount of aluminum (Al) present is octahedrally coordinated.

Preferably 12% or less, more preferably 10% or less, and still more preferably 5% or less, of the total amount of aluminum (Al) present in the very ultrastable zeolite Y (VUSY) is octahedrally coordinated.

Advantageously, the very ultrastable zeolite Y (VUSY) is substantially free of octahedrally coordinated aluminum (Al).

The amounts of octahedrally and tetrahedrally coordinated aluminum (Al) may be determined by means of $^{27}$Al MAS NMR. This technique is well known in the art and is described, for example, in "Advances in Catalysis," volume 33, 1985, pages 254–264.

The present invention further provides a process for reducing the amount of octahedrally coordinated aluminum (Al) present in a very ultrastable zeolite Y (VUSY) to below 15% which comprises contacting a very ultrastable zeolite Y (VUSY) with a solution of one or more metal sulfates selected from aluminum, gallium and iron sulfates, which solution has a pH of less than 5, preferably a pH of less than 4, and advantageously a pH of 3.

In order to obtain a pH of less than 5, the metal sulphate solution, preferably an aluminum sulphate solution, may be acidified by the addition of an acid, e.g. an inorganic acid such as sulphuric acid.

The process according to the invention may conveniently be carried out at temperatures up to 150° C. but is preferably carried out at a temperature in the range from 50 to 100° C.

In the context of the present application a very ultrastable zeolite Y (VUSY) is a zeolite Y having an alkali metal oxide content below 0.5% by weight and a unit cell size below 2.445 nm (24.45 Å).

Preferably, the very ultrastable zeolite Y (VUSY) has a unit cell size below 2.440 nm (24.40 Å).

More preferably, the very ultrastable zeolite Y (VUSY) has a unit cell size in the range from 2.425 to 2.435 nm (24.25 to 24.35 Å).

The very ultrastable zeolite Y (VUSY) may have a $SiO_2/Al_2O_3$ molar ratio up to 80, e.g. in the range from 3 to 80, preferably from 3 to 60, more preferably from 5 to 40, and especially from 5 to 20. Very advantageous results have been obtained using a very ultrastable zeolite Y (VUSY) having a $SiO_2/Al_2O_3$ molar ratio between 9 and 10.

A preferred very ultrastable zeolite Y (VUSY) to use in the process of the present invention is one having a unit cell size below 2.435 nm (24.35 Å), a degree of crystallinity which is at least retained at increasing $SiO_2/Al_2O_3$ molar ratios, a water adsorption capacity (at 25° C. and $p/p_0$ value of 0.2) of at least 8% by weight of the zeolite and a pore volume of at least 0.25 ml/g wherein between 10% and 60% of the total pore volume is made up of pores having a diameter of at least 8 nm. Such a zeolite is known from EP-B-247679.

Preferably, between 10% and 40% of the total pore volume of the very ultrastable zeolite Y (VUSY) is made up of pores having a diameter of at least 8 nm.

Suitably, the very ultrastable zeolite Y (VUSY) has a water adsorption capacity in the range from 8 to 10% by weight.

Preferably, the very ultrastable zeolite Y (VUSY) has a $SiO_2/Al_2O_3$ molar ratio in the range from 4 to 25, more preferably in the range from 8 to 15.

The catalyst of the present invention may further comprise a binder. As binder, it is convenient to use an inorganic oxide or a mixture of two or more such oxides. The binder may be amorphous or crystalline. Examples of suitable binders include alumina, silica, magnesia, titania, zirconia, silica-alumina, silica-zirconia, silica-boria and mixtures thereof. A preferred binder to use is alumina, or alumina in combination with a dispersion of silica-alumina in an alumina matrix, particularly a matrix of gamma alumina.

The catalyst of the present invention may contain from 1 to 99% w (per cent by weight) of the very ultrastable zeolite Y (VUSY) and from 1 to 99% w binder, based on the total dry weight of zeolite and binder.

Preferred catalysts of the invention are those containing from 1 to 80% w of the very ultrastable zeolite Y (VUSY) and from 20 to 99% w binder, based on the total dry weight of zeolite and binder. Still preferred catalysts are those containing from 10 to 70% w of the very ultrastable zeolite Y (VUSY) and from 30 to 90% w binder, in particular from 20 to 50% w of the VUSY and from 50 to 80% w binder, based on the total dry weight of zeolite and binder.

Depending on the application of the catalyst of the invention (e.g. in hydrocracking), it may further comprise at least one hydrogenation component. Examples of hydrogenation components useful in the present invention include Group 6B (e.g. molybdenum and tungsten) and Group 8 metals (e.g. cobalt, nickel, iridium, platinum and palladium), their oxides and sulphides, the numbering of the groups being in accordance with the system used by the Chemical Abstracts Service (CAS) as shown in the Periodic Table of Elements in the 72nd edition of the "Handbook of Chemistry and Physics" by the Chemical Rubber Company. The catalyst preferably contains at least two hydrogenation components, e.g. a molybdenum and/or tungsten component in combination with a cobalt and/or nickel component. Particularly preferred combinations are nickel/tungsten and nickel/molybdenum. Very advantageous results are obtained when the metals are used in the sulphide form.

The catalyst of the invention may contain up to 50 parts by weight of hydrogenation component, calculated as metal per 100 parts by weight of total catalyst. For example, the catalyst may contain from 2 to 40, more preferably from 5 to 25 and especially from 10 to 20, parts by weight of Group 6B metal(s) and/or from 0.05 to 10, more preferably from 0.5 to 8 and advantageously from 2 to 6, parts by weight of Group 8 metal(s), calculated as metal per 100 parts by weight of total catalyst.

The catalysts of the present invention which additionally comprise a binder and/or at least one hydrogenation component may be prepared in accordance with techniques conventional in the art.

For example, a catalyst for use in cracking comprising a very ultrastable zeolite Y (VUSY) in which less than 15% of the total amount of aluminum (Al) is octahedrally coordinated and a binder, may conveniently be prepared by first mixing the binder with water to form a slurry or sol, adjusting the pH of the slurry or sol as appropriate and adding the VUSY in powder form together with additional water to obtain the required solids concentration. The slurry or sol is then spray-dried. The spray-dried particles thus formed may be used directly or may be calcined prior to use.

Alternatively, a catalyst for use in hydrocracking comprising a very ultrastable zeolite Y (VUSY) in which less than 15% of the total amount of aluminum (Al) is octahedrally coordinated, a binder and at least one hydrogenation component of a Group 6B and/or Group 8 metal, may be prepared by co-mulling the VUSY and binder in the presence of one or more solutions of Group 6B and/or Group 8 metal salts and, optionally, a peptizing agent, extruding the mixture so formed into pellets and then calcining the pellets.

However, a preferred method of preparing such a hydrocracking catalyst comprises co-mulling the VUSY and binder in the presence of water and, optionally, a peptizing agent, extruding the resulting mixture into pellets and calcining the pellets. The pellets thus obtained are then impregnated with one or more solutions of Group 6B and/or Group 8 metal salts and again calcined.

The present invention still further provides a process for converting a hydrocarbonaceous feedstock into lower boiling materials which comprises contacting the feedstock at elevated temperature with a catalyst according to the invention.

The hydrocarbonaceous feedstocks useful in the present process can vary within a wide boiling range. They include lighter fractions such as kerosine fractions as well as heavier fractions such as gas oils, coker gas oils, vacuum gas oils, deasphalted oils, long and short residues, catalytically cracked cycle oils, thermally or catalytically cracked gas oils, and syncrudes, optionally originating from tar sands, shale oils, residue upgrading processes or biomass. Combinations of various hydrocarbon oils may also be employed. The feedstock will generally comprise hydrocarbons having a boiling point of at least 330° C. In a preferred embodiment of the invention, at least 50% w of the feedstock has a boiling point above 370° C. Nitrogen and sulphur contents in the hydrocarbonaceous feedstock are not critical. It is possible and may sometimes be desirable to subject part or all of the feedstock to a pretreatment, for example, hydrodenitrogenation, hydrodesulphurization or hydrodemetallization, methods for which are known in the art.

If the process is carried out under catalytic cracking conditions (i.e. in the absence of added hydrogen), the process is conveniently carried out in an upwardly or downwardly moving catalyst bed, e.g. in the manner of conventional Thermofor Catalytic Cracking (TCC) or Fluidized Catalytic Cracking (FCC) processes. The process conditions are preferably a reaction temperature in the range from 400 to 900° C., more preferably from 450 to 800° C. and especially from 500 to 650° C.; a total pressure of from $1 \times 10^5$ to $1 \times 10^6$ Pa (1 to 10 bar), in particular from $1 \times 10^5$ to $7.5 \times 10^5$ Pa (1 to 7.5 bar); a catalyst/feedstock weight ratio (kg/kg) in the range from 5 to 150, especially 20 to 100; and a contact time between catalyst and feedstock of from 0.1 to 10 seconds, advantageously from 1 to 6 seconds.

However, the process according to the present invention is preferably carried out under hydrogenating conditions, i.e. under catalytic hydrocracking conditions.

Thus, the reaction temperature is preferably in the range from 250 to 500° C., more preferably from 300 to 450° C. and especially from 350 to 450° C.

The total pressure is preferably in the range from $5 \times 10^6$ to $3 \times 10^7$ Pa (50 to 300 bar), more preferably from $7.5 \times 10^6$ to $2.5 \times 10^7$ Pa (75 to 250 bar) and even more preferably from $1 \times 10^7$ to $2 \times 10^7$ Pa (100 to 200 bar).

The hydrogen partial pressure is preferably in the range from $2.5 \times 10^6$ to $2.5 \times 10^7$ Pa (25 to 250 bar), more preferably from $5 \times 10^6$ to $2 \times 10^7$ Pa (50 to 200 bar) and still more preferably from $6 \times 10^6$ to $1.8 \times 10^7$ Pa (60 to 180 bar).

A space velocity in the range from 0.05 to 10 kg feedstock per liter catalyst per hour ($kg.l^{-1}.h^{-1}$) is conveniently used. Preferably the space velocity is in the range from 0.1 to 8, particularly from 0.1 to 5, $kg.l^{-1}.h^{-1}$. Furthermore, total gas rates (gas/feed ratios) in the range from 100 to 5000 Nl/kg are conveniently employed. Preferably, the total gas rate employed is in the range from 250 to 2500 Nl/kg.

The present invention will be further understood from the following illustrative Example.

EXAMPLE a) Preparation of a catalyst according to the present invention.

A commercially available very ultrastable zeolite Y (VUSY) having a unit cell size of 2.433 nm (24.33 Å), a $SiO_2/Al_2O_3$ molar ratio of 9.3, a water adsorption capacity (at 25 C and a $p/p_0$ value of 0.2) of 12.5% by weight, a nitrogen pore volume of 0.45 ml/g wherein 26% of the total pore volume is made up of pores having a diameter of at least 8 nm, and a loss of ignition of 13% by weight, and in which 40% of the total amount of aluminum (Al) present is octahedrally coordinated, was contacted with an aluminum sulphate solution (0.75 mol/l) of pH 3 at a temperature of 95° C. for one hour. After separation from this solution, the zeolite was washed and ammonia exchanged twice with a 1.0 mol/l ammonium nitrate solution at 95° C. The thus treated zeolite was found to have a unit cell size of 2.435 nm (24.35 Å) and a $SiO_2/Al_2O_3$ molar ratio of 20.9; 5% of the total amount of the aluminum (Al) present was octahedrally coordinated. Subsequently 26.4 g of the treated zeolite was mixed with 131.5 g hydrated aluminum oxide (ex-Criterion). To this mixture was added water and 3.8 g acetic acid. After mulling, the mixture was further mixed with 2.6 g extrusion aids and then extruded into pellets of cylindrical shape. The pellets were dried (with rotation) for 4 hours at 250° C. and subsequently calcined for 3 hours at 600° C. The pellets so obtained had a water pore volume of 0.63 ml/g and a circular end surface diameter of 1.65 mm. The pellets contained 20% by weight of very ultrastable zeolite Y (VUSY), in which 5% of the total amount of aluminum (Al) present was octahedrally coordinated, and 80% by weight alumina, on a dry basis. A nickel/tungsten solution was made up containing 11.57 g of nickel nitrate solution and 17.48 g of ammonium metatungstate. The nickel/tungsten solution was diluted with water to 18.9 ml and used to impregnate 30 g of pellets. The impregnated pellets were dried, with rotation, for 4 hours at 250° C. and finally calcined for 2 hours at 500° C. The pellets contained 4% by weight of nickel and 17% by weight of tungsten, based on total catalyst.

b) Hydrocracking experiment

The catalyst was subjected to a hydrocracking performance test involving a hydrotreated heavy vacuum gas oil having the following properties:

C (% wt): 86.21
H (% wt): 13.79
S (ppm): 35
N (ppm): <2
d (70/4): 0.8257
I.B.P. (° C.): 205
2/10: 252/332
20/30: 370/392
40/50: 410/428
60/70: 448/467
80/90: 492/525
F.B.P.: 598

The catalyst was firstly subjected to a presulphidizing treatment by slowly heating in a 15% v $H_2S/H_2$-atmosphere to a temperature of 375° C. The catalyst was tested in a 1:1 dilution with 0.1 mm SiC particles under the following operating conditions:
a space velocity of 1.1 $kg.l^{-1}.h^{-1}$, $H_2S$ 1.1% v, total pressure of $14 \times 10^6$ Pa (140 bar), and
a gas/feed ratio of 1500 Nl/kg. The experiment was carried out in once-through operation. The catalyst performance is expressed at 70% by weight conversion of 370° C.$^+$ boiling point material in the feed after allowing the catalyst to stabilize.

The following results were obtained with the catalyst:

Temperature required (70% conv. of 370° C.$^+$): 346° C.

Middle distillate selectivity (% wt): 49

Gas make (% wt): 5

From the above results it will be clear that attractive results can be obtained with a catalyst according to the present invention.

We claim:

1. A catalyst for use in a hydrocarbon conversion process comprising a very ultrastable zeolite Y having a unit cell size below 24.45 Å in which less than 15% of the total amount of aluminum (Al) present is octahedrally coordinated.

2. The catalyst of claim 1 wherein 10% or less of the total amount of aluminum (Al) present is octahedrally coordinated.

3. The catalyst of claim 2 wherein the very ultrastable zeolite Y (VUSY) has a unit cell size in the range from 2.425 to 2.435 nm (24.25 to 24.35 Å).

4. The catalyst of claim 2 wherein the very ultrastable zeolite Y (VUSY) has a $SiO_2/Al_2O_3$ molar ratio in the range from 3 to 80.

5. The catalyst of claim 1 which further comprises a binder.

6. The catalyst of claim 5 which further comprises at least one hydrogenation component.

7. The catalyst of claim 6 wherein the at least one hydrogenation component is selected from Group 6B and Group 8 metals, their oxides and sulphides.

8. A process for converting a hydrocarbonaceous feedstock into lower boiling materials comprising contacting the feedstock at elevated temperature with a catalyst of claim 1.

9. A process for converting a hydrocarbonaceous feedstock into lower boiling materials comprising contacting the feedstock with a catalyst of claim 6 under hydrogenating conditions.

10. The process of claim 9 which is carried out at a temperature in the range from 250 to 500° C. and a total pressure in the range from $5 \times 10^6$ to $3 \times 10^7$ Pa.

* * * * *